US006372824B1

(12) United States Patent
Song et al.

(10) Patent No.: US 6,372,824 B1
(45) Date of Patent: Apr. 16, 2002

(54) CATIONIC ELECTRODEPOSITION COATING COMPOSITION AND A PROCESS FOR PREPARING THE SAME

(75) Inventors: Ki-Myong Song; Jong-Myung Hong; Hoon Chung; Seung-Jae Back, all of Kyeongki-do (KR)

(73) Assignee: Daihan Paint & Ink Co., Ltd. (KR)

( * ) Notice: Subject to any disclaimer, the term of this patent is extended or adjusted under 35 U.S.C. 154(b) by 0 days.

(21) Appl. No.: 09/549,729

(22) Filed: Apr. 14, 2000

Related U.S. Application Data

(62) Division of application No. 08/928,044, filed on Sep. 11, 1997, now Pat. No. 6,147,144.

(30) Foreign Application Priority Data

Dec. 31, 1996 (KR) .............................. 96-81294

(51) Int. Cl.[7] .............................. C08K 3/20; C08L 63/02
(52) U.S. Cl. ....................... 523/412; 204/489; 204/501; 204/502; 204/504; 204/506
(58) Field of Search ................. 523/408, 412; 204/489, 501, 502, 504, 506

(56) References Cited

U.S. PATENT DOCUMENTS 3,663,839 A    5/1972    Low et al. ..................... 310/4
3,947,338 A    3/1976    Jerabek et al. ............... 204/181
3,947,339 A    3/1976    Jerabek et al. ............... 204/181
3,984,299 A    10/1976   Jerabek ....................... 204/181

*Primary Examiner*—Robert Dawson
*Assistant Examiner*—D. Aylward
(74) *Attorney, Agent, or Firm*—Ostrolenk, Faber, Gerb & Soffen, LLP

(57) ABSTRACT

Disclosed are a cationic electrodeposition coating composition and a process for preparing the same in which the dried coating film of the electrodeposition paint has an epoxy-acrylic double-layered structure for displaying excellent properties, and in which an organic solvent content can be minimized. The cationic electrodeposition coating composition having a resinoid dispersed into an aqueous medium comprises a cationic electrodeposition resin and an organic solvent of less than 2.0 percent by weight based on a dispersed solution of the cationic electrodeposition resin. The cationic electrodeposition resin can be manufactured by means of a mixture comprising (i) 40–60 percent by weight of a cationic electrodeposition synthetic resin which is obtained by an epoxy-amino addition reaction, (ii) 5–10 percent by weight of an acrylic cationic electrodeposition synthetic resin having an amino group, (iii) 1–3 percent by weight of a fatty acid ester resin synthesized by an ester exchange reaction of styrene-arylalcohol copolymer and fatty acid, and (iv) 30–50 percent by weight of a blocked polyisocyanate crosslinking agent. The coating layer formed by means of the electrodeposition coating has improved properties with respect to an appearance, weather resistance, yellowing resistance, and hardness.

9 Claims, No Drawings

CATIONIC ELECTRODEPOSITION COATING COMPOSITION AND A PROCESS FOR PREPARING THE SAME

This is a division of application Ser. No. 08/928,044, filed Sep. 11, 1997 now Pat. No. 6,147,144.

BACKGROUND OF THE INVENTION

The present invention relates to a novel cationic electrodeposition paint composition and a process for preparing the same, and more particularly to a cationic electrodeposition coating composition in which the electrodeposited coating film of the electrodeposition paint composition has an epoxy-acrylic double-layered structure, and in which an organic solvent content can be minimized, and a process for preparing the same. Further, the present invention relates to a pigment grinding vehicle suitable for electrodeposition coating of the cationic electrodeposition paint composition.

The cationic electrodeposition paint is widely used for primer coating of cars, household electric appliances, and industrial machines. Recent research at home and abroad on a cationic electrodeposition paint have concentrated on paints related to energy saving, safety and environmental considerations. Also, research or binders of electrodeposition coating have concentrated on developing high functional and high efficient electrodeposition paint having various purposes and characteristics. Among the research, studies on reducing an organic solvent emissions from paint operations are being developed. The motive for these studies is the regulation of emission of organic solvents for the protection of the environment. As examples of regulations related to the regulation of emission of organic solvents, a regulation for volatile organic compounds (VOC) of the Environment Office in U.S. and an atmospheric purification law in Germany can be illustrated. The former establishes a guideline for the amount of organic solvents in a paint, while the latter restricts the amount of organic solvents discharged from the paint used for coating a car. Since 20% of the amount of carbon dioxide discharged in the whole world are due to the coating industry (for example, organic solvent and combustion by means of a drying oven), the coating industry is a major cause of environmental pollution. Hence, the coating industry has become the subject of supervision.

Presently, as an electrodeposition coating for primer coating, epoxy cationic electrodeposition paints are mainly used. However, these epoxy cationic electrodeposition paints are rich in organic solvents and these solvents are evaporated from the electrodeposition tank, thereby emitting an offensive odor in a workpiece. Also, these solvents are emitted during baking, so environmental pollution problems occur. Though these epoxy cationic electrodeposition paints have excellent properties such as chemical resistance, corrosion-resistance, adhesion etc., they are lacking in properties such as weather-resistance, yellowing resistance, etc.

SUMMARY OF THE INVENTION

Accordingly, considering the problems described above, it is an object of the present invention to provide an improved cationic electrodeposition composition in which an organic solvent content can be minimized and the electrodeposited coating layer has an epoxy-acrylic double-layered structure for improving properties such as weather-resistance, yellowing resistance, etc.

It is a further object of the present invention to provide a process for preparing a cationic electrodeposition composition particularly suited for manufacturing cationic electrodeposition coating.

It is yet another object of the present invention to provide a pigment grinding vehicle suitable for electrodeposition coating of the cationic electrodeposition composition.

In accordance with the present invention, a cationic electrodeposition coating composition having a resinoid dispersed into an aqueous medium is provided. The cationic electrodeposition coating composition of the present invention essentially comprises a cationic electrodeposition resin prepared by a reaction of (a) 40–60 percent by weight of a cationic electrodeposition synthetic resin obtained by an epoxy-amino addition reaction, (b) 5–10 percent by weight of an acrylic cationic electrodeposition resin having an amino group, (c) 1–3 percent by weight of a fatty acid ester resin synthesized by an estrification reaction of styrene-allylalcohol copolymer and a fatty acid, and (d) 30–50 percent by weight of a blocked polyisocyanate crosslinking agent. A cationic electrodeposition coating composition is obtained by dispersing the cationic electrodeposition resin into an aqueous medium. At this time, an organic solvent is contained less than 2.0 percent by weight based on the dispersed solution of the cationic electrodeposition resin.

DETAILED DESCRIPTION OF THE INVENTION

Hereinafter, the present invention will be explained in more detail.

The cationic electrodeposition resin according to the present invention is a major film forming resin in an electrodeposition coating composition. Some of these known film forming resins are illustrated in U.S. Pat. Nos. 3,663, 839; 3,984,299; 3,947,338; and 3,947,339. These film forming resins represent a resin having an amino group formed by an addition reaction of polyepoxide with a primary, secondary or tertiary amine. As for the cationic electrodeposition synthetic resin formed by the addition reaction of polyepoxide and amine, a resin having the following structural formula can be illustrated:

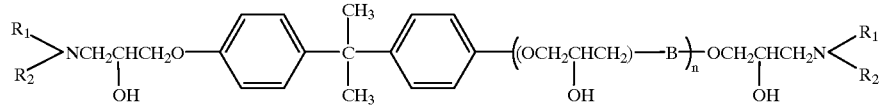

wherein $R_1$, $R_2$ and B are as follows, and n is an integer of 3 or 4.

| | $R_1$ | $R_2$ | B |
|---|---|---|---|
| N-methylethanol amine | $-CH_3$ | $-(CH_2)_2OH$ | $-[-(CH_2)_5-CO-O-]-$ $(-CH_2)_5-$ |
| diketimine | $-CH_2N=C(CH_3)CH_2CH(CH_3)_2$ | $R_2=R_1$ | |

If the amount of the cationic electrodeposition synthetic resin having an amino group used is less than 40 percent by weight, mechanical properties of the dried coating layer are weak, and if the amount of the cationic electrodeposition synthetic resin having a amino group used exceeds 60 percent by weight, the manufacture of a water-dispersed solution is difficult. Therefore, the amount of the cationic electrodeposition resin having an amino group used is preferably about 40–60 percent by weight, and more preferably about 45–55 percent by weight.

In addition, as an other cationic electrodeposition resin, an acrylic cationic electrodeposition resin having an amino group which is copolymerized with butyl acrylate, methyl acrylate, hydroxy ethyl acrylate, styrene, methyl methacrylate, (N,N-dimethyl)aminoethyl methacrylate, etc., can be illustrated. The structural formula of the acrylic cationic electrodeposition resin is as follows:

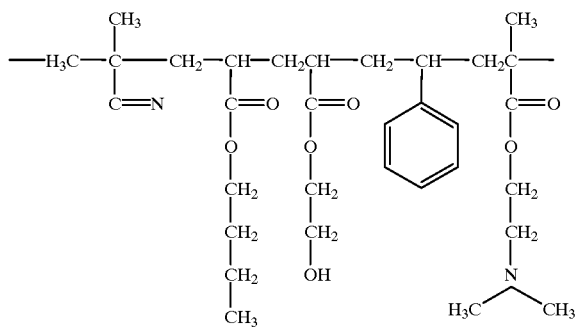

If the amount of the acrylic cationic electrodeposition resin used is less than 5 percent by weight, a dried coating film having an epoxy-acrylic double-layered structure cannot be obtained, and if the amount of the acrylic cationic electrodeposition resin used exceeds 10 percent by weight, the epoxy resin and acrylic resin are not compatible, thereby affecting the surface appearance and gloss. Therefore, the amount of the acrylic cationic electrodeposition resin used is preferably about 5–10 percent by weight, and more preferably about 7–9 percent by weight.

Usually these resins having an amino group are used together with a blocked polyisocyanate crosslinking agent. The isocyanate is so completely blocked that it can be mixed with the resin having an amino group. Otherwise, the isocyanate is partially blocked in such a manner that it can react with the backbone of a resin. As for the blocked polyisocyanate crosslinking, agent, a compound having the following structural formula can be illustrated:

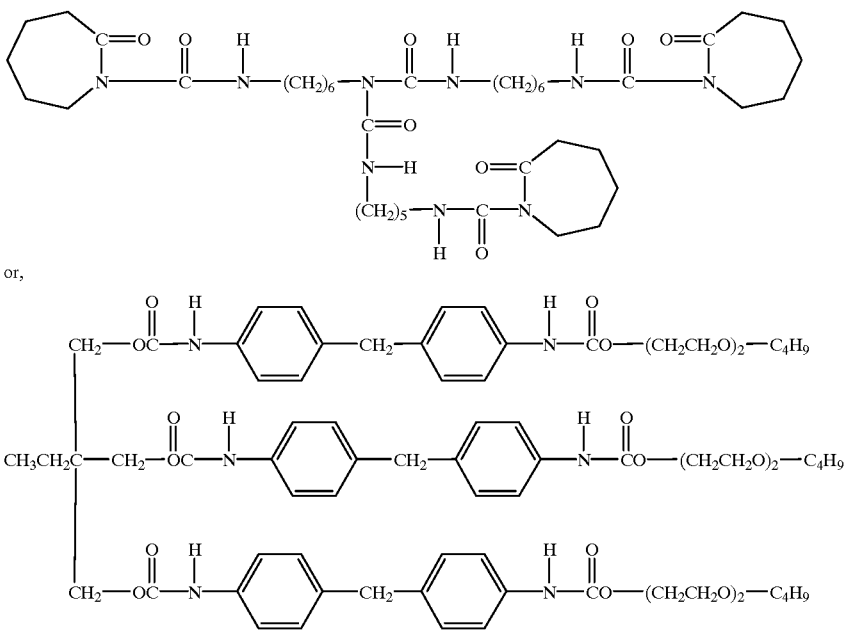

If the amount of the blocked polyisocyanate crosslinking agent used is less than 30 percent by weight, properties such as pencil hardness, corrosion resistance, etc., are diminished. If the amount of the blocked polyisocyanate crosslinking, agent used exceeds 50 percent by weight, the preparation of a water-dispersed solution is difficult and properties such as impact-resistance, flexible-resistance, etc., are diminished. Therefore, the amount of the blocked polyisocyanate crosslinking agent used is preferably about 30–50 percent by weight, and more preferably 35–45 percent by weight.

Particularly, the composition of the present invention comprises a fatty acid ester synthetic resin synthesized by an estrification reaction of styrene-allylalcohol and fatty acid in order to improve a smoothness of the electrodeposition coating film and to inhibit pinhole and cratering. As the fatty acid ester synthetic resin, a resin having the following structural formula can be illustrated:

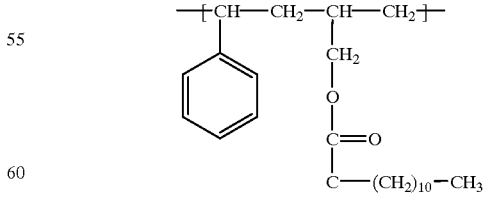

The molecular weight (weight-average molecular weight) of these fatty acid ester resins is preferably between about 2000 and about 40,000, and more preferably is between about 3000 and about 30,000. If the amount of these fatty acid ester resins used is less than 1 percent by weight, an improvement of the smoothness of the electrodeposition coating film and the restraint of pinhole and cratering cannot be achieved. But, if the amount of these fatty acid ester resins used exceeds 3 percent by weight, mechanical properties of the dried coating film such as pencil hardness is deteriorated. Therefore, the amount of the fatty acid ester resin used is preferably about 1–3 percent by weight, and more preferably about 1.5–2.5 percent by weight.

The aqueous medium may contain a coalescing solvent besides water. As an effective coalescing solvent, ketone, hydrogen carbonate, alcohol, ether, etc. can be illustrated. The cationic electrodeposition composition according to the present invention may contain pigments, solvents and additives such as a surface improving additive, a surfactant, a thickening agent, a catalyst, etc. As the catalyst, a metallic salt of organic acids such as cobalt acetate, chromeoctoate, chromenaphthenate, lead acetate and dibutyltinoxide may be usually used.

In accordance with the present invention, the cationic electrodeposition resin can be manufactured in the presence of a low boiling point organic solvent by the reaction of (a) about 40–60 percent by weight of a cationic electrodeposition synthetic resin obtained by an epoxy-amino addition reaction, (b) about 5–10 percent by weight of an acrylic cationic electrodeposition resin having an amino group, (c) about 1–3 percent by weight of a fatty acid ester resin synthesized by an estrification reaction of styrene-allylalcohol copolymer and fatty acid, and (d) about 30–50 percent by weight of a blocked polyisocyanate crosslinking agent. The low boiling point organic solvent has a boiling point less than approximately 140° C. As the low boiling point organic solvent, methylisobutylketone, xylene, tolune, methylethylketone, etc. can be illustrated.

The cationic electrodeposition synthetic resin obtained by an epoxy-amino addition reaction may be manufactured by using an epoxy resin, polycaprolactonediol, bisphenol A, and benzyl dimethyl amine. Thereafter, about 35–45 parts by weight of the cationic electrodeposition resin, about 55–65 parts by weight of deionized water, about 0.3–1.5 weight parts of an acid for neutralization and about 0.5–1.5 weight parts of a cationic surfactant are mixed to prepare a water-dispersed solution. Then, the water-dispersed solution is extracted under reduced pressure to remove the low boiling point organic solvent. In the following, the water-dispersed solution is filtered to prepare the cationic electrodeposition coating composition. During the process of using the acid for neutralization, the degree of neutralization of the existing amino group is preferably about 20–100%, and more preferably is about 40–70%. According to a suitable neutralization method, an acid for neutralization such as formic acid, acetic acid, lactic acid and phosphoric acid, a surfactant, deionized water, etc., are added and water-dispersed by a high-speed stirring so that excellent water-dispersed resin solution may be obtained.

Successively, a solvent stripping of the low boiling point organic solvent is performed at about 40–80° C. and at about 30–90 mmHg, and more preferably is performed under a reduced pressure of about 50–70 mmHg. Then, a high boiling point organic solvent having a boiling point over 140° C., which has been included in the preparation of the cationic electrodeposition synthetic resin obtained by an epoxy-amino addition reaction, the acrylic cationic electrodeposition resin having an amino group, and the fatty acid ester resin synthesized by an estrification reaction of styrene-allylalcohol copolymer and fatty acid, remains. Meanwhile, low boiling point organic solvents such as methylisobutylketone, xylene, tolune, methylethylketone, etc., are partially removed.

After the solvent stripping process for making the solid content of the cationic electrodeposition water-dispersed resin solution about 20–60 percent by weight, and more preferably about 30–40 percent by weight, the water-dispersed resin is filtered through diatomaceous earth in such a manner that an improved cationic electrodeposition coating composition can be obtained. The average particle size of the improved cationic electrodeposition coating composition is less than 0.3 µm and the organic solvent content is minimized.

Also, the present invention provides a pigment grinding vehicle for the cationic electrodeposition coating composition. The pigment grinding vehicle is prepared by using about 25–35 percent by weight of polyglycidylether of bisphenol A, about 5–12 percent by weight of propyleneglycol monomethyl ether acetate, about 8–15 percent by weight of a partially blocked isocyanate cross-linking agent, about 25–40 percent by weight of ethyleneglycol monobutyl ether, about 10–20 percent by weight of an organic tertiary aminate and about 0–5 percent by weight of deionized water.

If the amount of the polyglycidylether of bisphenol A used is less than about 25 percent by weight, properties such as corrosion resistance, water resistance, etc. are deteriorated, and if the amount of the polyglycidylether of bisphenol A used exceeds 35 percent by weight, mechanical properties of the dried coating layer such as hardness is diminished. Therefore, the amount of the polyglycidylether of bisphenol A used is preferably about 25–35 percent by weight, and more preferably about 27–32 percent by weight.

If the amount of the propyleneglycol monomethyl ether acetate used is less than 5 percent by weight, the process of melting the polyglycidylether resin of bisphenol A is poorly performed. If the amount of the propyleneglycol monomethyl ether acetate used exceeds 12 percent by weight, the stability of the paint manufactured with the pigment grinding vehicle is deteriorated. Therefore, the amount of the propyleneglycol monomethyl ether acetate used is preferably about 5–12 percent by weight, and more preferably about 7–10 percent by weight.

If the amount of the partially blocked isocyanate cross-linking agent used is less than 8 percent by weight, the hardness of the coating layer is lessened. If the amount of the partially blocked isocyanate cross-linking agent used exceeds 15 percent by weight, the mechanical property of the coating layer is lowered due to the increase of the hardness of the coating layer. Therefore, the amount of the partially blocked isocyanate cross-linking agent used is preferably about 8–15 percent by weight, and more preferably about 10–13 percent by weight.

If the amount of the ethyleneglycol monobutyl ether used is less than 25 percent by weight, the stability of the electrodeposition paint is poor, and if the amount of the ethyleneglycol monobutyl ether used exceeds 40 percent by weight, the organic solvent content is increased. So, the amount of the ethyleneglycol monobutyl ether used is preferably about 25–40 percent by weight, and more preferably about 30–35 percent by weight.

If the amount of the organic tertiary aminate used is less than 10 percent by weight, the water-miscibility is insufficient. If the amount of the organic tertiary aminate used exceeds 20 percent by weight, the property of water resistance is poor. So, the amount of the organic tertiary aminate used is preferably about 10–20 percent by weight, and more preferably about 13–16 percent by weight. At this time, if the polyglycidylether of bisphenol A has an epoxy equivalent weight less than about 900, chemical properties of the coating layer such as water resistance, corrosion resistance, etc., are poor. If the polyglycidylether of bisphenol A has an epoxy equivalent weight larger than about 1200, the appearance of the coating layer and mechanical properties are poor. Therefore, the epoxy equivalent weight of the polyglycidylether of bisphenol A used is preferably about 900–1200 (weight-average molecular weight is 1400–2800).

Hereinafter, the present invention will be explained in more detail referring to the preferred embodiments. However, the present invention is not limited to the following embodiments. The parts are by weight and the percents are by weight too.

SYNTHETIC EXAMPLE 1

A cationic acrylic copolymer resin was manufactured using the following mixture.

| ingredients | weight parts |
| --- | --- |
| ethylene glycol monobutyl ether | 34.7 |
| butyl acrylate | 6.2 |
| styrene | 29.3 |
| (N,N-dimethyl)aminoethyl methacrylate | 5.9 |
| 2-hydroxyethyl acrylate | 11.8 |
| methyl methacrylate | 1.8 |
| isobornyl methacrylate | 4.1 |
| ethylene glycol monobutyl ether | 0.9 |
| azobisisobutyronitrile | 0.7 |
| ethylene glycol monobutyl ether | 1.9 |
| azobisisobutyronitrile | 0.7 |

34.7 parts of ethylene glycol monobutyl ether was introduced into a flask and held under nitrogen atmosphere at 110° C. Then a mixture of 6.2 parts of butyl acrylate, 29.3 parts of styrene, 5.9 parts of (N,N-dimethyl)aminoethyl methacrylate, 11.8 parts of 2-hydroxyethyl acrylate, 1.8 parts of methyl methacrylate and 4.1 parts of isobornyl methacrylate at 115° C. was dropped over four hours. Also, a mixture of 0.7 parts of azobisisobutyronitrile and 1.9 parts of ethylene glycol monobutyl ether was dropwisely added to the resultant through a funnel over an hour. After one hour, a mixture of 0.7 parts of azobisisobutyronitrile and 1.9 parts of ethylene glycol monobutyl ether was dropwisely added to the resultant through a funnel over an hour. After the addition, the mixture was held for three hours to obtain a cationic acrylic copolymer whose amine value was 30–40 and solid content was 60 percent.

SYNTHETIC EXAMPLE 2

| ingredients | weight parts |
| --- | --- |
| coconut fatty acid | 9.9 |
| styrene-arylalcohol copolymer | 60.3 |
| xylene | 1.9 |
| ethylene glycol monobutyl ether | 27.9 |

A fatty acid ester resin synthesized by an estrification reaction of styrene-allylalcohol copolymer and fatty acid was manufactured from the following mixture.

After 9.9 parts of palm oil (fatty acid) and 60.3 parts of styrene-arylalcohol copolymer were introduced into a flask and heated to 140° C. to be melted, the resultant mixture was heated to 220° C. and held at this temperature to obtain a fatty acid ester resin synthesized by an ester exchange reaction of styrene-arylalcohol copolymer and fatty acid.

The acid value of the fatty acid ester resin was less than 4 and the solid content thereof was 70.

EXAMPLE 1

From the mixture having the following ingredients, a cationic electrodeposition resin was manufactured.

| ingredients | weight parts |
| --- | --- |
| EPIKOTE 828CD*[1] | 27.1 |
| PLACCEL 205*[2] | 9.7 |
| bisphenol A | 7.9 |
| methyl isobutyl ketone | 2.4 |
| benzyl dimethyl amine | 0.15 |
| cationic resin containing (N,N-dimethyl)aminoethyl methacrylate (synthetic example 1) | 9.0 |
| fatty acid ester resin synthesized by an estrification reaction of styrene-allylalcohol copolymer and fatty acid (synthetic example 2) | 1.6 |
| blocked polyisocyanate cross-linking agent*[3] | 40.5 |
| diketimine derived from diethylene triamine and methyl isobutyl ketone (73% of solid content in methyl isobutyl ketone) | 3.0 |
| N-methylethanolamine | 2.6 |

*[1]EPIKOTE 828CD is an epoxy resin manufactured by the reaction of epichlorohydrin and bisphenol A, which may be purchased from Kumho Shell Chemical Co., Ltd. in Korea. The epoxy equivalent weight thereof was approximately 188.
*[2]PLACCEL 205 is a polycaprolactonediol which may be purchased from DICEL Corp. in Japan.
*[3]The blocked polyisocyanate cross-linking agent was manufactured from the mixture having the following ingredients. A mixture containing polymethylene-polyphenyl isocyanate and diphenylmethyl-4,4-diisocyanate (Polymeric MDI (PAPI-135K) which may be purchased from HD POLYURETHANE Co., in Korea) was half blocked with diethylene glycol monobutyl ether. Then, the resulting product was reacted with trimethylolpropane at a molar ratio of 3:1 to form the polyurethane cross-linking agent.

A water dispersed solution of the cationic electrodeposition resin was prepared from the mixture of the following ingredients.

| ingredients | weight parts |
| --- | --- |
| cationic electrodeposition resin according to the present example | 103.95 |
| acetic acid | 1.2 |
| cationic surfactant*[1] | 1.4 |
| deionized water | 158.3 |

*[1]The cationic surfactant is a commercially available XS-139, which may be purchased from Air Products and Chemical Inc..

1-(a) Preparation of a Cationic Electrodeposition Resin 27.1 parts of EPIKOTE 828CD, 9.7 parts of PLACCEL 205, 7.9 parts of bisphenol A and 2.4 parts of methyl isobutyl ketone were introduced into a reactor. The mixture was then heated to 140° C. under nitrogen atmosphere. Then 0.04 parts of benzyl dimethyl amine was added to the reaction mixture, which was heated to 210° C. and was reacted at a reflux temperature for thirty minutes to remove water. The resultant mixture was cooled to 160° C. and held in that state for one and half hours. Then, the resulting mixture was cooled to 145 ° C. and 0.11 parts of benzyl dimethyl amine was added to the resulting product, which was reacted at 145° C. for approximately two and half hours to prepare the cationic electrodeposition synthetic resin obtained by an epoxy-amino addition reaction. To the cationic electrodeposition synthetic resin obtained by an epoxy-amino addition reaction, 9.0 parts of a cationic resin having (N, N-dimethyl) aminoethyl methacrylate, 1.6 parts of a fatty acid ester resin synthesized by an estrification reaction of styrene-allylalcohol copolymer and fatty acid and 40.5 parts of a blocked isocyanate cross-linking agent were sequentially and slowly added at the same temperature. Next, 3.0 parts of diketimine (73% of solid content in methyl isobutyl ketone) derived from diethylene triamine and methyl isobutyl ketone and 2.6 parts of N-methyl ethanol amine were added to the resultant at 100–110° C., which was held at 125° C. for an hour to obtain the cationic electrodeposition resin.

1-(b) Preparation of a Dispersed Solution of the Cationic Electrodeposition Resin 158.3 parts of the deionized water, 1.2 parts of an acetic acid and 1.4 parts of a cationic surfactant, XS-139, were successively introduced into a reactor and homogenized. Then, 103.95 parts of the cationic electrodeposition resin was slowly added and was stirred at a high speed in order to water-disperse. Meanwhile, a solvent stripping process was performed at 60° C. and under a reduced pressure of approximately 60 mmHg in order to remove a low boiling point organic solvent. Then, the water-dispersed resin was filtered through diatomaceous earth in such a manner that a water-dispersed solution of the cationic electrodeposition resin whose solid content was 40% and average particle size was less than 0.3 µm can be obtained. The organic solvent content in the water-dispersed solution of the obtained cationic electrodeposition resin was approximately 1.7%.

1-(c) Preparation of a Pigment Grinding Vehicle

A pigment grinding vehicle was prepared by reacting polyglycidyl ether of bisphenol A, a partially blocked isocyanate cross-linking agent and organic tertiary aminate as follows.

| ingredients | weight parts |
| --- | --- |
| EPPIKOTE 3004CD*[1] | 29.0 |
| propylene glycol monomethyl ether acetate | 10.0 |
| partially blocked isocyanate cross-linking agent*[2] | 12.0 |
| ethylene glycol monobutyl ether | 33.0 |
| organic tertiary aminate*[3] | 14.0 |
| deionized water | 2.0 |

*[1]Polyglycidylether of bisphenol A (epoxy equivalent weight 900–1200) which may be purchased from Kumho Shell Chemical, Co., Ltd. in Korea, was used.
*[2]The used partially blocked isoyanate cross-linking agent was prepared by reacting 54.3 parts of 2,4-tolueneisocyanate and 40.7 parts of 2-ethylhexanol at less than 40° C. for three hours, adding 5.0 parts of methyl isobutyl ketone and diluting.
*[3]The used organic tertiary aminate was manufactured as follows. 15.5 parts of dimethyl ethanol amine and 56.7 parts of a partially blocked isocyanate cross-linking agent were reacted at a room temperature for two hours. The disappearance of NCO peak could be confirmed at 80° C. Then, 17.4 parts of lactic acid (purity 88%), 3.5 parts of deionized water and 7.0 parts of ethylene glycol monobutyl ether were added and reacted at 60° C. for an hour to obtain the organic tertiary aminate.

29.0 parts of EPIKOTE 3004CD and 10.0 parts of propylene glycol monomethyl ether acetate were added to a reactor and heated to 110–120° C. so as to melt homogeneously. To the resulting product was added 12.0 parts of a partially blocked isocyanate cross-linking agent, and the resulting product was held for an hour. Next, 33.0 parts of ethylene glycol monobutyl ether was added to the resulting product, which was heated to 80–90° C. Thereafter, 14.0 parts of organic tertiary aminate and 2.0 parts of deionized water were added to the resulting product, which was held until the acid value became approximately 1 so the pigment grinding vehicle was obtained. At this time, the epoxy equivalent weight of the polyglycidyl ether of bisphenol A was 900–1200.

1-(d) Electrodeposition Coating and Application Test

A mixture of 0.9 parts of carbon black, 24 parts of titanium dioxide, 5.0 parts of lead silicate, 1.8 parts of aluminum silicate and 18 parts of the pigment grinding vehicle were ground in a bead mill to have a particle size of less than 15 µm, thereby obtaining a dispersed product. 9.8 parts of the dispersed product, 40.7 parts of the dispersed solution of the cationic electrodeposition resin and 49.5 parts of deionized water were homogeneously stirred to obtain a diluted product.

EXAMPLE 2

Another dispersed solution of a cationic electrodeposition resin was prepared from the mixture having the following ingredients.

| ingredients | weight parts |
| --- | --- |
| EPIKOTE 829*[1] | 27.1 |
| bisphenol A | 17.6 |
| xylene | 2.4 |
| benzyl dimethyl amine | 0.15 |
| cationic resin containing (N,N-dimethyl)aminoethyl methacrylate (synthetic example 1) | 9.0 |
| fatty acid ester resin synthesized by an estrification reaction of styrene-allylalcohol copolymer and fatty acid (synthetic example 2) | 1.6 |
| blocked polyisocyanate cross-linking agent*[2] | 40.5 |
| diketimine derived from diethylene triamine and methyl isobutyl ketone (73% of solid content in methyl isobutyl ketone) | 3.0 |
| N-methylethanolamine | 2.6 |

*[1]EPIKOTE 829 is an epoxy resin manufactured by the reaction of epichlorohydrin and bisphenol A, which may be purchased from Kumho Shell Chemical Co., Ltd. in Korea. The epoxy equivalent weight was approximately 188.
*[2]The blocked polyisocyanate cross-linking agent was prepared as follows. First, toluene diisocyanate (80/20 2,4/2,6-isomeric mixture) was half blocked with 2-ethylhexanol. Then, the resultant was reacted with trimethylolpropane at a molar ratio of 3:1. The cross-linking agent exists as a solution state in methyl isobutyl ketone.

A dispersed solution of the cationic electrodeposition resin was prepared from the mixture of the following ingredients.

| ingredients | weight parts |
| --- | --- |
| cationic electrodeposition resin according to the present example | 103.95 |
| 88% lactic acid | 2.9 |
| cationic surfactant*[1] | 1.4 |
| deionized water | 158.3 |

*[1]The cationic surfactant is commercially available XS-139, which may be purchased from Air Products and Chemical Inc.

2-(a) Preparation of a Cationic Electrodeposition Resin 27.1 parts of EPIKOTE 829, 17.6 parts of bisphenol A and 2.4 parts of xylene were introduced into a reactor and then heated to 140° C. under nitrogen atmosphere. Then 0.04 parts of benzyl dimethyl amine was added to the resultant, which was heated to 210° C. The reaction was performed at a reflux temperature for approximately thirty minutes so that water was removed. The reaction mixture was cooled to 160° C. and was held in that state for about one and a half hours. Thereafter, the reaction mixture was cooled to 145° C. and 0.11 parts of benzyl dimethyl amine was added. A cationic electrodeposition synthetic resin obtained by an epoxy-amino addition reaction was manufactured by reacting at 145° C. for approximately two and a half hours. To the cationic electrodeposition synthetic resin obtained by an epoxy-amino addition reaction, 9.0 parts of a cationic resin having (N, N-dimethyl)aminoethyl methacrylate, 1.6 parts of a fatty acid ester resin synthesized by an estrification reaction of styrene-allylalcohol copolymer and fatty acid, and 40.5 parts of a blocked isocyanate cross-linking agent were slowly and successively added at the same temperature. Thereafter, 3.0 parts of diketimine (73% of solid content in methyl isobutyl ketone) derived from diethylene triamine and methyl isobutyl ketone and 2.6 parts of N-methyl ethanol amine were added at 100–110° C. and the resultant was held at 125° C. for an hour to obtain the cationic electrodeposition resin.

2-(b) Preparation of a Dispersed Solution of the Cationic Electrodeposition Resin 158.3 parts of the deionized water, 2.9 parts of 88% lactic acid and 1.4 parts of a cationic surfactant, XS-139, were successively introduced into a reactor and homogenized. 103.95 parts of the cationic electrodeposition resin was then slowly added and the mixture was stirred at a high speed so as to water-disperse. Meanwhile, the low boiling point organic solvent was removed by means of a solvent stripping process at 60° C. under a reduced pressure of approximately 60 mmHg. Then, the water-dispersed resin was filtered through diatomaceous earth in such a manner that water-dispersed solution of the cationic electrodeposition resin could be obtained. The average particle size of the water-dispersed solution of the cationic electrodeposition resin was less than 0.3 μm and the solid content thereof was 40%. The organic solvent content in the obtained cationic electrodeposition resin was approximately 1.7%.

2-(c) Preparation of a Pigment Grinding Vehicle

A pigment grinding vehicle was manufactured by reacting polyglycidyl ether of bisphenol A, a partially blocked isocyanate cross-linking agent and organic tertiary aminate, as follows.

| ingredients | weight parts |
| --- | --- |
| EPIKOTE 3004CD*[1] | 29.0 |
| propylene glycol monomethyl ether acetate | 10.0 |
| partially blocked isocyanate cross-linking agent*[2] | 12.0 |
| ethylene glycol monobutyl ether | 33.0 |
| organic tertiary aminate*[3] | 14.0 |
| deionized water | 2.0 |

*[1]Polyglycidylether of bisphenol A which may be purchased from Kumho Shell Chemical Co., Ltd. in Korea (epoxy equivalent weight 900–1200) was used.
*[2]The partially blocked isocyanate cross-linking agent was prepared by reacting 54.3 parts of 2,4-tolueneisocyanate and 40.7 parts of 2-ethylhexanol at less than 40° C. for three hours, and diluting the resultant by adding 5.0 parts of methyl isobutyl ketone.

-continued

| ingredients | weight parts |
| --- | --- |

*[3]The organic tertiary aminate can be manufactured as follows. 15.5 parts of dimethyl ethanol amine and 56.7 parts of a partially blocked isocyanate cross-linking agent were reacted at a room temperature for two hours. The disappearance of NCO peak could be confirmed at 80° C. Then, 17.4 parts of lactic acid (purity 88%), 3.5 parts of deionized water and 7.0 parts of ethylene glycol monobutyl ether were added and reacted at 60° C. for an hour to obtain the organic tertiary aminate.

29.0 parts of EPIKOTE 3004CD and 10.0 parts of propylene glycol monomethyl ether acetate were added to a reactor and heated to 100–120° C. so as to melt homogeneously. 12.0 parts of a partially blocked isocyanate cross-linking agent was then added to the resultant. The reaction mixture was heated to 80–90° C. Next, 14.0 parts of organic tertiary aminate and 2.0 parts of deionized water were added to the resultant, which was held until the acid value became approximately 1 to obtain the pigment pulverizing vehicle of which dispersibility and storage stability were excellent.

2-(d) Electrodeposition Coating and Application Test

A mixture of 0.9 parts of carbon black, 24 parts of titanium dioxide, 5.0 parts of lead silicate, 18 parts of aluminum silicate and 18 parts of the pigment grinding vehicle were ground in a bead mill until the particle size was less than 15 μm. 9.8 parts of this dispersed material, 40.7 parts of the dispersed solution of the cationic electrodeposition resin and 49.5 parts of deionized water were stirred uniformly to obtain a diluted product.

COMPARATIVE EXAMPLE 1

A dispersed solution of a cationic electrodeposition resin the same as that of Example 1 was manufactured using the resin synthesized by the same method as mentioned in Example 1, except that a cationic resin having (N, N-dimethyl)aminoethyl methacrylate (Synthetic Example 1) and a fatty acid ester resin synthesized by an estrification reaction of styrene-allylalcohol copolymer and fatty acid (Synthetic Example 2) were not added to the cationic electrodeposition resin composition of Example 1-(a).

COMPARATIVE EXAMPLE 2

A dispersed solution of a cationic electrodeposition resin the same as that of Example 2 was manufactured using the resin synthesized by the same method as mentioned in Example 2, except that a cationic resin having (N, N-dimethyl)aminoethyl methacrylate (Synthetic Example 1) and a fatty acid ester resin synthesized by an estrification reaction of styrene-allylalcohol copolymer and fatty acid (Synthetic Example 2) were not added to the cationic electrodeposition resin composition of Example 2-(a).

TABLE 1

Testing Results of the Properties on the Electrodeposition Coated Film of Example 1 and 2 and in Comparative Examples 1 and 2

| | Example 1 | Example 2 | Comparative Example 1 | comparative example 2 |
| --- | --- | --- | --- | --- |
| appearance | ⊙ | ⊙ | ○ | ○ |
| gloss (60° glossmeter) | 64 | 63 | 64 | 66 |

TABLE 1-continued

Testing Results of the Properties on the Electrodeposition Coated Film of Example 1 and 2 and in Comparative Examples 1 and 2

|  | Example 1 | Example 2 | Comparative Example 1 | comparative example 2 |
|---|---|---|---|---|
| pencil hardness (Mitsubishiuni) | 3H | 3H | 2H | 2H |
| adhesion*1 | ⊚ | ⊚ | ⊚ | ⊚ |
| impact-resistance*7 (½" × 500 g × 50 cm) | OK | OK | OK | OK |
| flexible-resistance*8 (Mandrel Conical) | OK | OK | OK | OK |
| corrosion resistance*2 | ⊚ | ⊚ | ⊚ | ⊚ |
| corrosion resistance*3 | ⊚ | ⊚ | ⊚ | ⊚ |
| water-resistance*4 | ⊚ | ⊚ | ⊚ | ⊚ |
| solvent-resistance*5 | ⊚ | ⊚ | ⊚ | ⊚ |
| yellowing resistance*6 | ⊚ | ⊚ | Δ | Δ |
| weather-resistance*9 | ⊚ | ⊚ | Δ | Δ |

*note:
⊚; excellent, ○; good, Δ; common, x; bad
*1cross-cut: A taping test was performed by cross-cutting the film in a size of 1 mm × 1 mm within a size of 1 cm × 1 cm.
*2corrosion resistance 1: After spraying 5% NaCl solution to the film at 35° C. over a thousand hours and allowing it to stand for twenty-four hours, a taping test was performed.
*3corrosion resistance 2: After immersing the film in 5% NaCl solution at 50° C. for two-hundred forty hours, a taping test was performed.
*4water-resistance: After immersing the film in hot-water at 50° C. for two-hundred forty hours, the external appearance of the coating layer was observed.
*5solvent-resistance: After reciprocating rubbing the film twenty times with methyl isobutyl ketone solvent, the presence of any abnormality in the coating layer was observed.
*6yellowing resistance: After coating a small amount of white enamel paint on the electrodeposition coated test plate, curing at 150° C. for more than forty minutes and drying, the degree of yellowing resistance in the top coating was tested.
*7impact-resistance: The test was executed five times by means of an impact-resistance tester manufactured from Dupont Co. wherein a coating layer which was not destroyed more than four times was regarded as OK.
*8flexible-resistance: The test was executed five times by means of a Mandrel Conical flexible-resistance tester wherein a coating layer which did not crack for more than four times was regarded as OK.
*9weathering resistance: Gloss and color difference were tested by means of a Weather-O-Meter (W.O.M) for two hundred hours.

As shown in Table 1, the coating layer formed by using the cationic electrodeposition coating composition of Examples 1 and 2 using the cationic resin having (N, N-dimethyl)aminoethyl methacrylate (Synthetic Example 1) and the fatty acid ester resin synthesized by an estrification reaction of styrene-allylalcohol copolymer and fatty acid (Synthetic Example 2), has an excellent appearance, yellowing resistance, weather resistance, etc. Meanwhile the coating layer formed by using the cationic electrodeposition coating composition of Comparative Examples 1 and 2 without employing the cationic resin and the fatty acid ester resin, has a good appearance but not as good as that of Examples 1 and 2, and has a similar level of yellowing resistance and weather resistance as that of Examples 1 and 2. Moreover, from the aspect of pencil hardness, the coating layer formed by using the cationic electrodeposition coating composition of Examples 1 and 2 is better than that of Comparative Examples 1, and 2.

As described above, the dispersed solution of the cationic electrodeposition resin in the cationic electrodeposition coating composition according to the present invention has an organic solvent content of less than 2.0%. Therefore, the organic solvent content is reduced to the minimum. Further, the coating layer formed by means of electrodeposition coating has improved properties from the aspects of appearance, yellowing resistance, weather resistance and hardness while other excellent characteristics are maintained.

What is claimed is:

1. A method for manufacturing a cationic electrodeposition coating composition, comprising the steps of:
   preparing a cationic electrodeposition resin in the presence of an organic solvent by using (a) about 40–60 percent by weight of a cationic electrodeposition synthetic resin which is obtained by an epoxy-amino addition reaction, (b) about 5–10 percent by weight of an acrylic cationic electrodeposition resin having an amino group, (c) about 1–3 percent by weight of a fatty acid ester resin synthesized by an estrification reaction of styrene-allylalcohol copolymer and fatty acid, and (d) about 30–50 percent by weight of a blocked polyisocyanate cross-linking agent;
   preparing a water-dispersed solution by mixing about 35–45 parts by weight of said cationic electrodeposition resin, about 55–65 parts by weight of deionized water, 0.3–1.5 parts by weight of an acid for neutralization and 0.5–1.0 parts by weight of a cationic surfactant; and
   stripping the organic solvent of said water-dispersed solution under reduced pressure to partially remove the organic solvent from said water-dispersed solution, and filtering said water-dispersed solution.

2. The method for manufacturing the cationic electrodeposition coating composition as claimed in claim 1, wherein said organic solvent has a boiling point less than about 140° C.

3. The method for manufacturing the cationic electrodeposition coating composition as claimed in claim 2, wherein said organic solvent is at least any one selected from the group consisting of methyl isobutyl ketone, xylene, toluene, and methyl ethyl ketone.

4. The method for manufacturing the cationic electrodeposition coating composition as claimed in claim 1, wherein the step of stripping the organic solvent of said water-dispersed solution is performed at about 40–80° C. and under a pressure of about 30–90 mmHg.

5. The method for manufacturing the cationic electrodeposition coating composition as claimed in claim 1, wherein said cationic electrodeposition synthetic resin which is obtained by an epoxy-amino addition reaction is manufactured by using an epoxy resin, polycaprolactonediol, bisphenol A, and benzyl dimethyl amine.

6. The method for manufacturing the cationic electrodeposition coating composition as claimed in claim 1, wherein said acid for neutralization is at least any one selected from the group consisting of acetic acid, lactic acid, phosphoric acid, and formic acid.

7. The method for manufacturing the cationic electrodeposition coating composition as claimed in claim 1, wherein the degree of neutralization of an existing amino group during the course of using said acid for neutralization is about 20–100%.

8. The method for manufacturing the cationic electrodeposition coating composition as claimed in claim 7, wherein the degree of neutralization of an existing amino group during the course of using said acid for neutralization is about 40–70%.

9. The method for manufacturing the cationic electrodeposition coating composition as claimed in claim 1, wherein the step of stripping an organic solvent of said water-dispersed solution is performed by making the solid content of said water-dispersed cationic electrodeposition resin about 20–60 percent by weight and by filtering said water-dispersed cationic electrodeposition resin through diatomaceous earth.

* * * * *